United States Patent [19]
Huang

[11] Patent Number: 5,490,576
[45] Date of Patent: Feb. 13, 1996

[54] AIR PRESSURE ADJUSTING MODULE HAVING VARIABLE BLADE DEVICE OF INDEPENDENT STRUCTURE

[76] Inventor: Fu-Shiang Huang, 46-1 Kan-Tou, 3 Lin, Jui-Chin Chun, Shin-Feng Hsiang, Hsing-Chu Hsien, Taiwan

[21] Appl. No.: 371,970

[22] Filed: Jan. 12, 1995

[51] Int. Cl.⁶ .................................................... F16N 7/34
[52] U.S. Cl. .................. 184/55.2; 137/853; 137/892; 239/533.13
[58] Field of Search ................................ 184/55.1, 55.2, 184/57, 58, 59, 6.26; 137/853, 892; 239/364–366, 407, 434, 533.13, 310; 261/64.3, 64.4, 78.2

[56] References Cited

U.S. PATENT DOCUMENTS

| | | | |
|---|---|---|---|
| 230,066 | 7/1880 | Royle | 184/55.2 |
| 2,564,309 | 8/1951 | Norgren | 184/55.2 |
| 2,945,560 | 7/1960 | Malec | 184/55.2 |
| 2,948,297 | 8/1960 | Langdon | 137/853 |
| 3,351,292 | 11/1967 | Stuart, Sr. | 239/533.13 |
| 4,735,288 | 4/1988 | Uematsu et al. | 184/55.1 |
| 4,807,721 | 2/1989 | Fujiwara | 184/55.2 |

FOREIGN PATENT DOCUMENTS

| | | | |
|---|---|---|---|
| 0881180 | 6/1953 | Germany | 184/55.2 |
| 2249740 | 5/1992 | United Kingdom | 239/310 |

*Primary Examiner*—Edward K. Look
*Assistant Examiner*—Christopher Verdier
*Attorney, Agent, or Firm*—Bacon & Thomas

[57] ABSTRACT

An air pressure adjusting module having variable blade device of independent structure is disclosed. The device being connected to an oil supplying device mounted with a nozzle having an external throttle and an internal throttle provides a finer and homogeneous atomized air-oil mixture which enhance the lubricating effect.

3 Claims, 9 Drawing Sheets

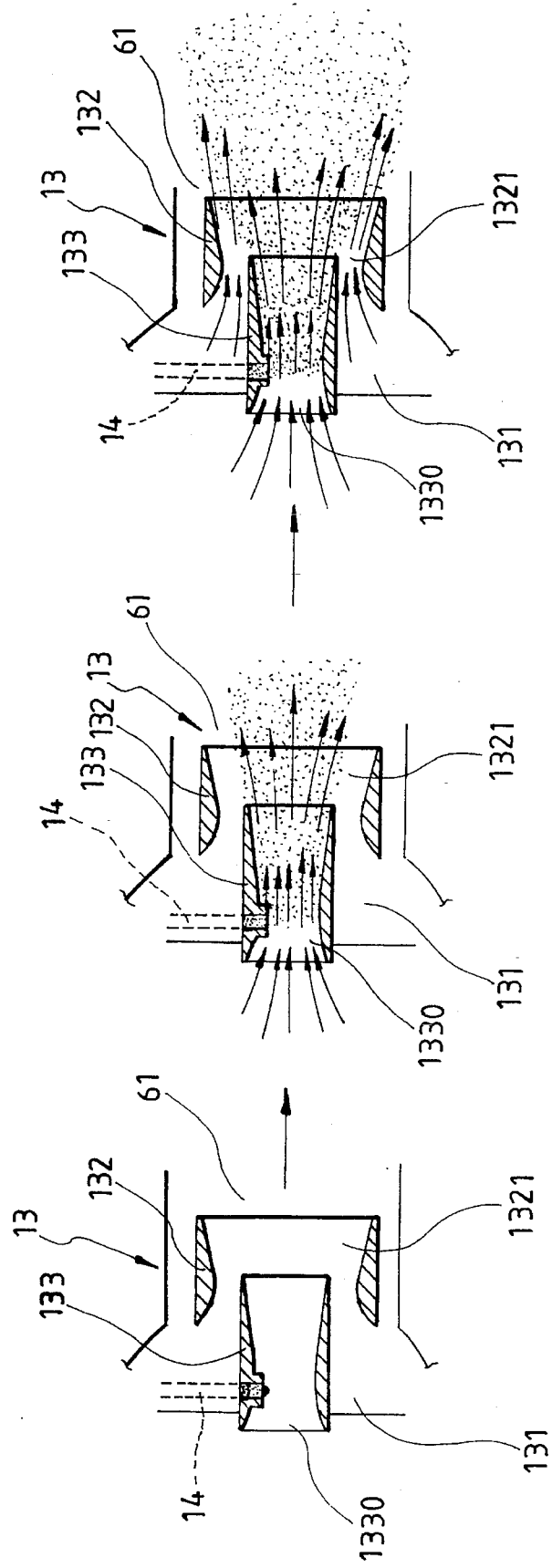

AIR PRESSURE ADJUSTING MODULE HAVING VARIABLE BLADE DEVICE OF INDEPENDENT STRUCTURE

BACKGROUND OF THE INVENTION

The present invention relates to an air pressure adjusting module having variable blade device of independent structure in combination with the oil atomizing system such that during the transporting of air, the dual-throttle type nozzle is kept in lubricating condition and the pressure drop and contamination are greatly reduced to a lowest level.

The high pressure air required by the pneumatic devices provided by air compressors. Owing to the fact that the compressed air may be contaminated by varies type of external materials, such as water droplets, dust, oil residue from the compressor, rust and scales, etc., the control of the air pressure may be interfered. Therefore, device is needed so as to remove the contaminants in order to ensure the normal operation of the components. The present module is a device mounted behind the air compressor but in front of the pneumatic device.

Conventional air pressure adjusting module comprises a tube connecting head C to link the air pressure adjusting device B, the filtering device A and the oil supplying device 1 as a unit (as shown in FIG. 7). Recently, the more advanced air pressure adjusting module comprises an air device and a pressure adjusting value as a unit (hereinafter referred as filtering device) and in combination with an oil supplying device (as shown in FIG. 6). The air after passing through the filtering and pressure adjusting device enters the oil supplying device such that the adjustment of air pressure is in a smooth progression. That is, the compressed air after passing through those devices, the contaminants will be removed and the air stream will adjust to a stable stream and then passes to the oil supplying device. The lubrication oil is supplied by the oil supply device and is atomized with the compressed air and then provided to the pneumatic tools.

In the conventional oil supply device structure, an oil cup containing lubrication oil is provided at the lower end of the device. The top of the device is provided with an oil-adjusting device mounted with a leading tube extended into the oil. The oil path is connected to a nozzle within the device. By the principle of Venturi, the lubrication oil can be sucked and mixed with air and atomized for the use in the pneumatic tools.

As shown in FIG. 6, the configuration of the nozzle mounted within the prior pressure adjusting module has a single throttle. In order to allow the lubrication oil to be sucked out smoothly after the air passed through the nozzle, the compressed air has to be lead into the cup containing the lubrication oil, such that the pressure in the cup is larger than that at the body chamber of the device. Thus, a blade must be needed and be mounted in front of the nozzle, and only a small gap is provided for the passage of the air.

However, all these prior embodiments have drawbacks as follows:

1. The air at the horizontal may cause a great pressure drop and the small diameter inner wall will cause a rapid collision of air, these cause turbulent, whirlpool and thus affect the stability of air supplying. This also produce poor atomized oil and the effectiveness of lubrication cannot be obtained. Therefore, a great lost of lubrication oil and a tendency of contamination.

2. Due to the limited space of the oil supplying device, the blade and the nozzle are mounted together. Therefore, they cannot produce their function properly within the pressure tube.

SUMMARY OF THE PRESENT INVENTION

It is therefore the primary object of the present invention to provide an air pressure adjusting module having variable blade device, wherein a blade cap is mounted within the oil supplying machine to form a multiflow structure.

It is another object of the present invention to provide an air pressure adjusting module having variable blade device, wherein when the compressed air passes through the blade cap and the nozzle, it produces an excellent flow effect and the lubrication oil becomes finer and homogeneous.

It is yet another object of the present invention to provide an air pressure adjusting module having variable blade device, wherein the multiflow horizontal channel has a round inlet and a square outlet, and a blade cap is mounted at the front end of the horizontal channel.

It is another object of the present invention to provide an air pressure adjusting module having variable blade device, wherein the inclined angle of the outlet is corresponding to the diameter of the inlet.

Yet another object of the present invention to provide an air pressure adjusting module having variable blade device, wherein the square outlet is provided with elastic blades at the lateral side.

The attainment of the foregoing and related objects advantages and features of the invention should be more readily apparent after review of the following more detailed description of the invention, taken together with the drawings in which

BRIEF DESCRIPTION OF THE DRAWING

FIG. 4-1 is a sectional view of the dual-throttle nozzle, wherein the air has not passed through the nozzle;

FIG. 4-2 is a sectional view of the dual-throttle nozzle, wherein the air passed through the nozzle;

FIG. 4-3 is a sectional view of the nozzle showing the air passed through the inner value.

FIG. 4-4 is a sectional view of the nozzle showing the air passed through the internal of the throttle and showing mixing of the atomized oil with the air;

FIG. 5-1 shows schematic view of the blade cap with indication of air flow;

DETAILED DESCRIPTION OF THE PRESENT INVENTION

Figure 1:
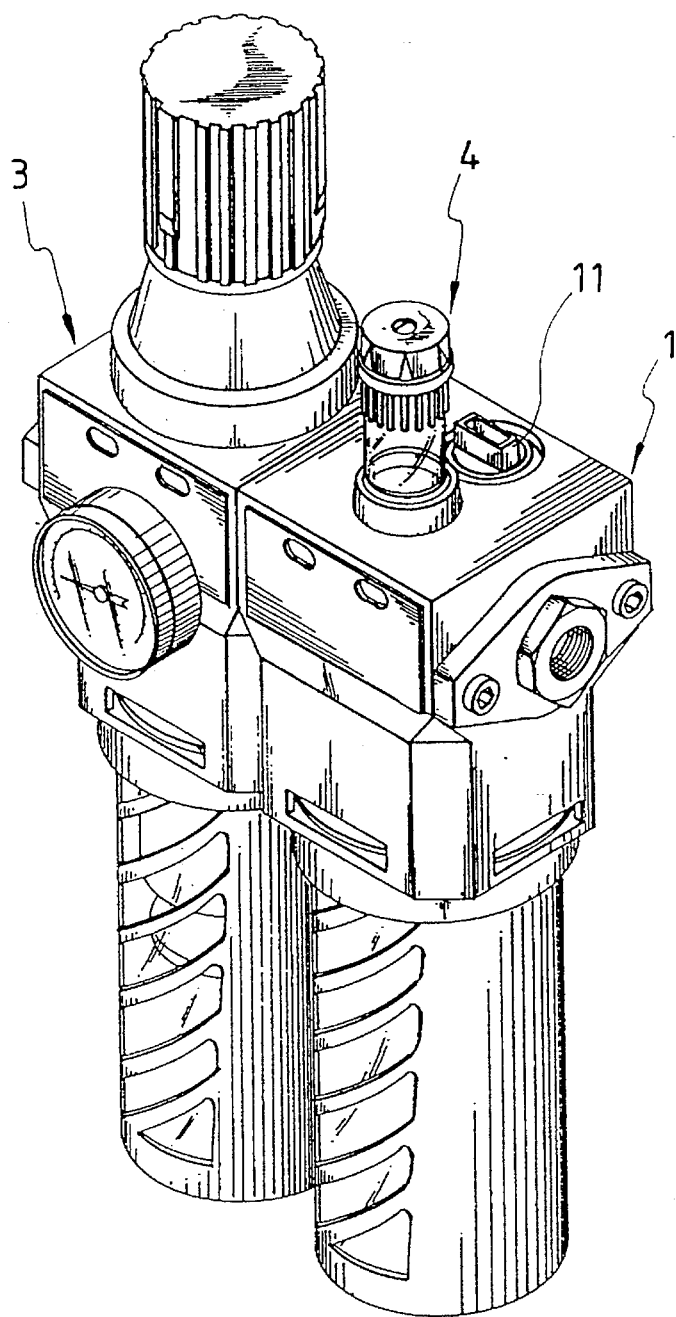
FIG. 1 is a perspective view of an air pressure adjusting module.

Turning now to the drawings, in particular to FIG. 1, which shows an air pressure adjusting module having a variable device. The module is to be mounted onto the oil supplying device 1 so as to control the amount of the lubrication oil which will be sucked by the oil supplying device 1, and allows the lubrication oil to be atomized into fine and well mixed oil and air, such that the lubricating oil provides a high quality lubricating function and lowers pollution.

Figure 2:
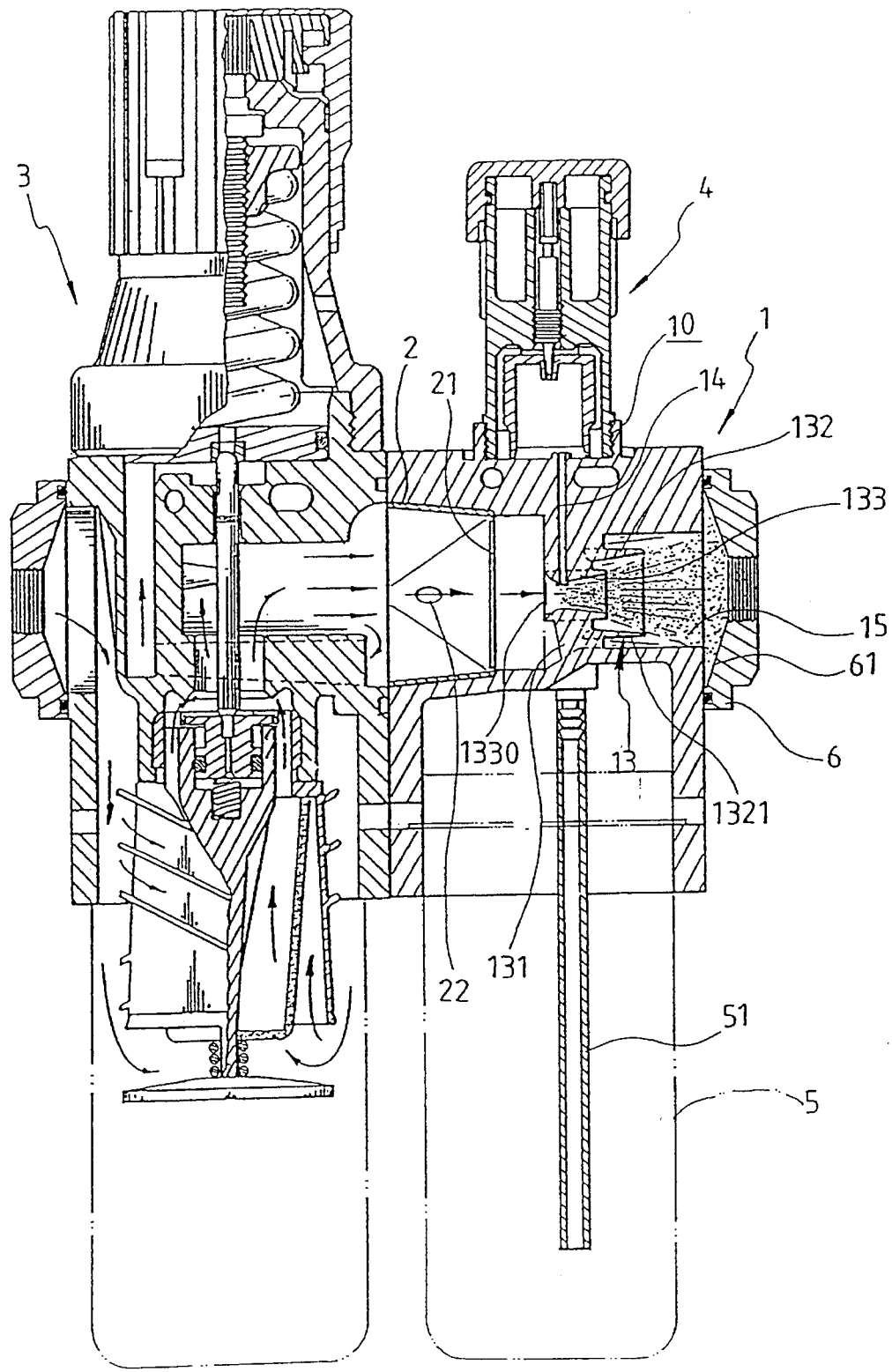
FIG. 2 is a sectional view of the air pressure adjusting module in accordance with the present invention.
Figure 3:
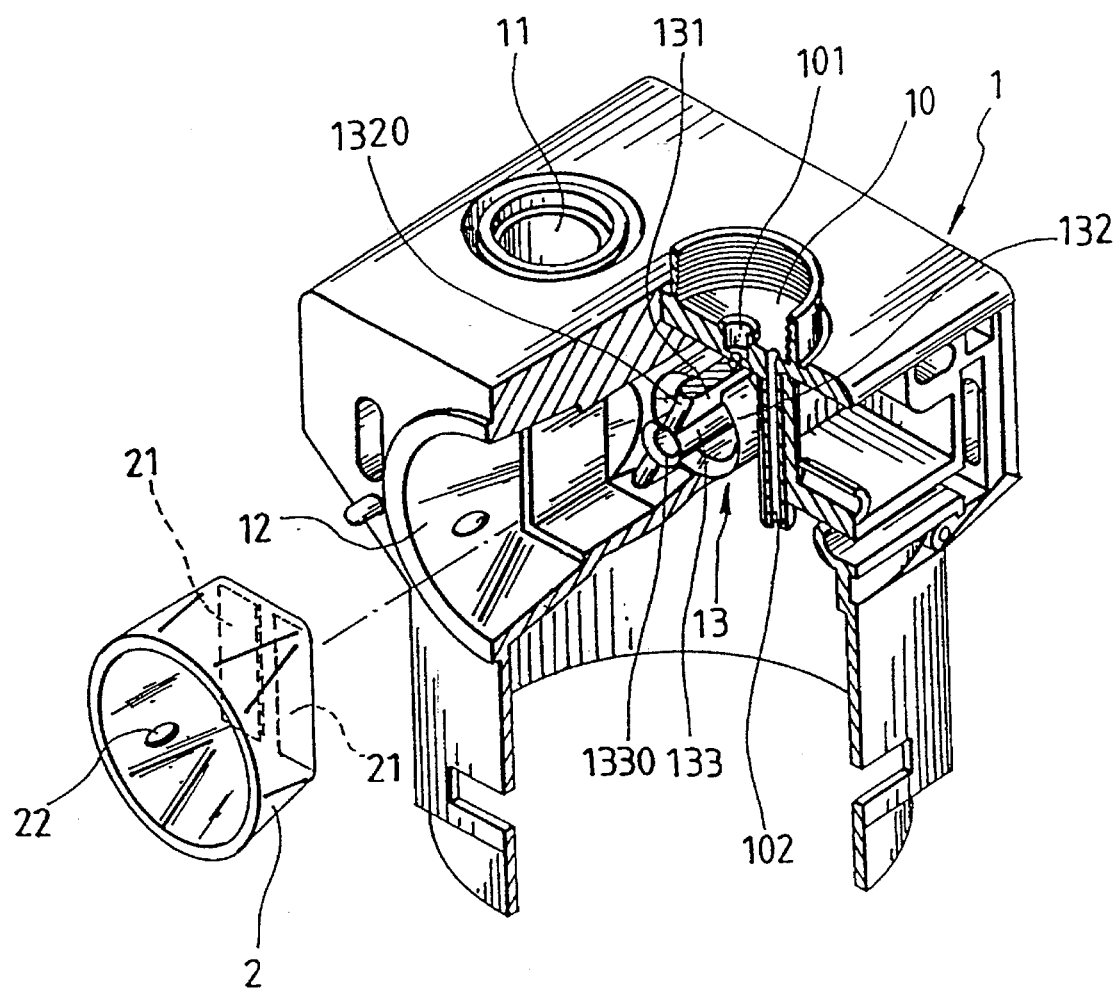
FIG. 3 is an exploded perspective view of the air pressure adjusting module.
Figure 4:
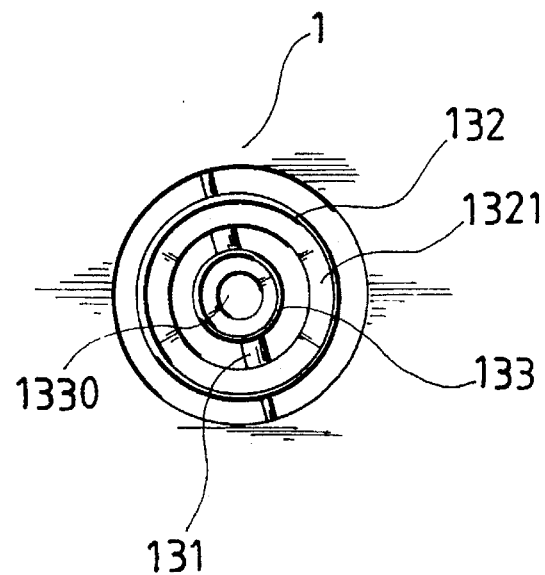
FIG. 4 is a plan view of the structure of a dual-throttle nozzle in accordance with the present invention.

Referring to FIGS. 2 and 3, the oil supplying device 1 is provided with a screw hole 10 and an oil inlet on the top of the device 1. At the bottom face of the screw hole 10, an oil inlet hole 101 is provided! An oil adjusting device 4 is mounted on the screw hole 10. An oil leading tube 102 is provided at one edge of said screw hole 10. At the lower end of the tube 102, an oil tube 51 is connected and extended into the oil cup 5 mounted at the lower end of said oil supplying device 1. The lubricating oil contained in the cup 5 is sucked into the screw hole via tube 51 and 102 by Venturi Principle. The oil is then entering the oil supplying device via the oil adjusting device. A nozzle 13 is provided within the oil supplying device 1. The nozzle 13 has an external throttle 132 and an inner throttle 133 (as shown in FIG. 4). The throttles 132 and 133 are connected by a rib 131.

The shape of the inner throttle is a tapered conic hole 1330. The inlet hole of the external throttle 132 has an inclined face 1320 and the outlet hole 1 has a tapered shaped face 1321 so as to provide the function of ejection of the nozzle. As shown in FIGS. 4-1 to 4-3, the nozzle has an inner throttle 133 and an external throttle 132, such that the oil hole being in communication with said inner throttle 133 via the rib 131. When air is compressed, the air passes through the inner throttle 133 and the external throttle 132, and when the air is at the inner throttle 133, the lubrication oil in the tube 14 is sucked and atomized and become very fine and homogeneous oil-air mixture. The oil-air mixture provides an excellent lubricating effect.

Figure 5:
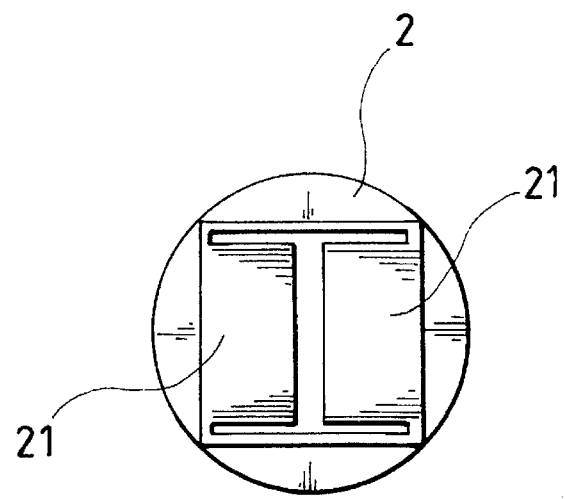
FIG. 5 shows a plan view of the blade cap in accordance with the present invention.
Figure 4:
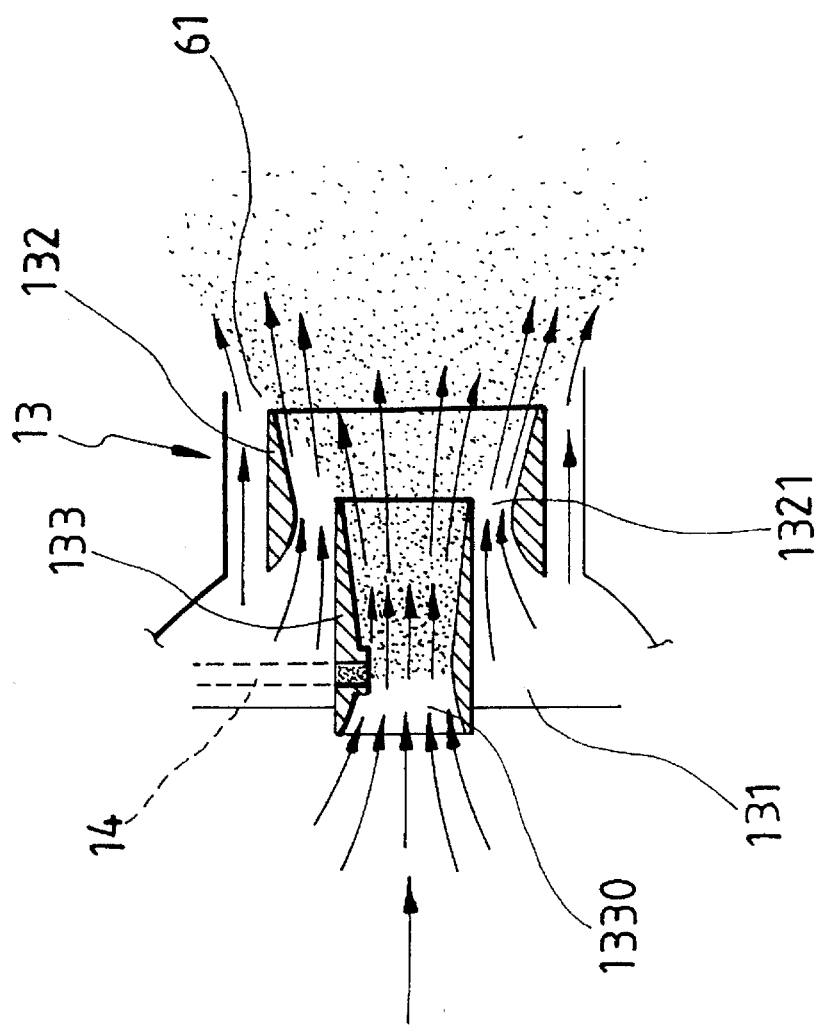
Figures 1, 5:
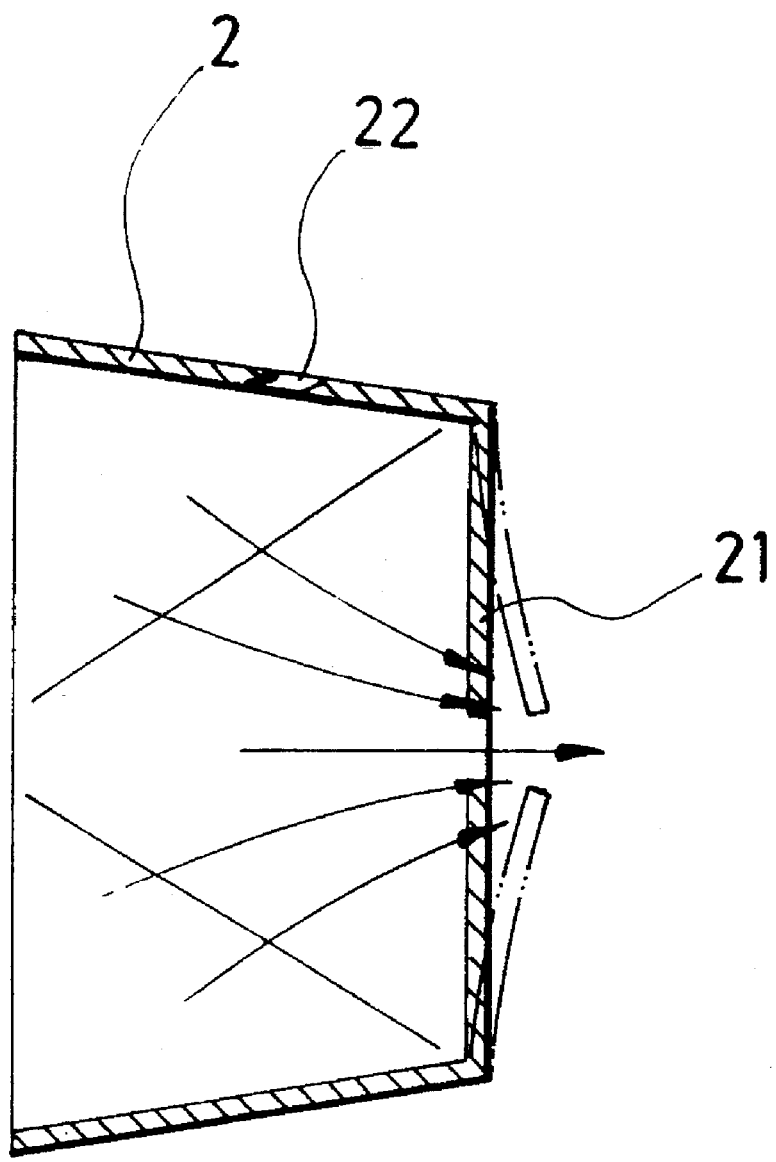
Figure 6:
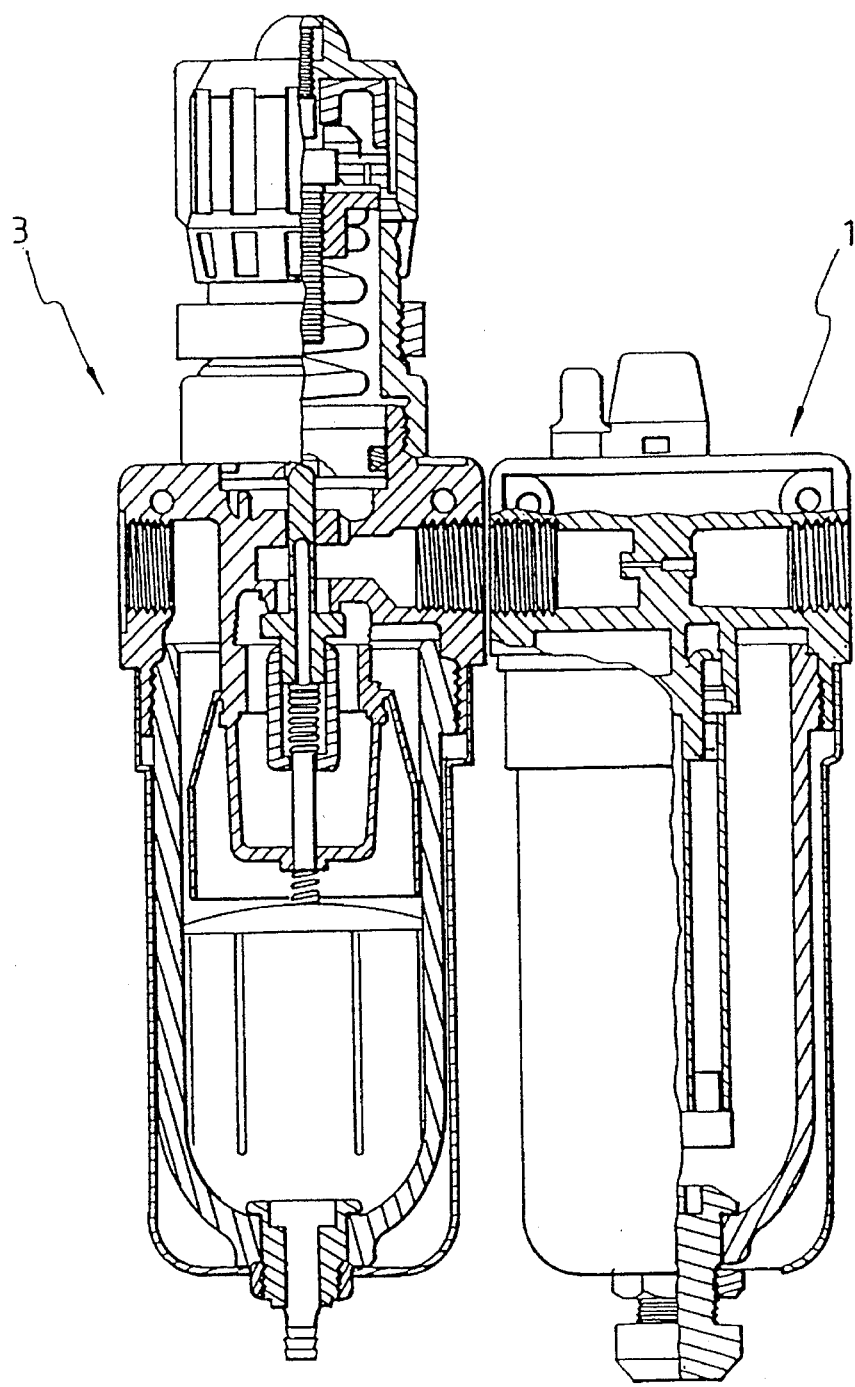
FIG. 6 is a sectional view of a prior art.
Figure 7:
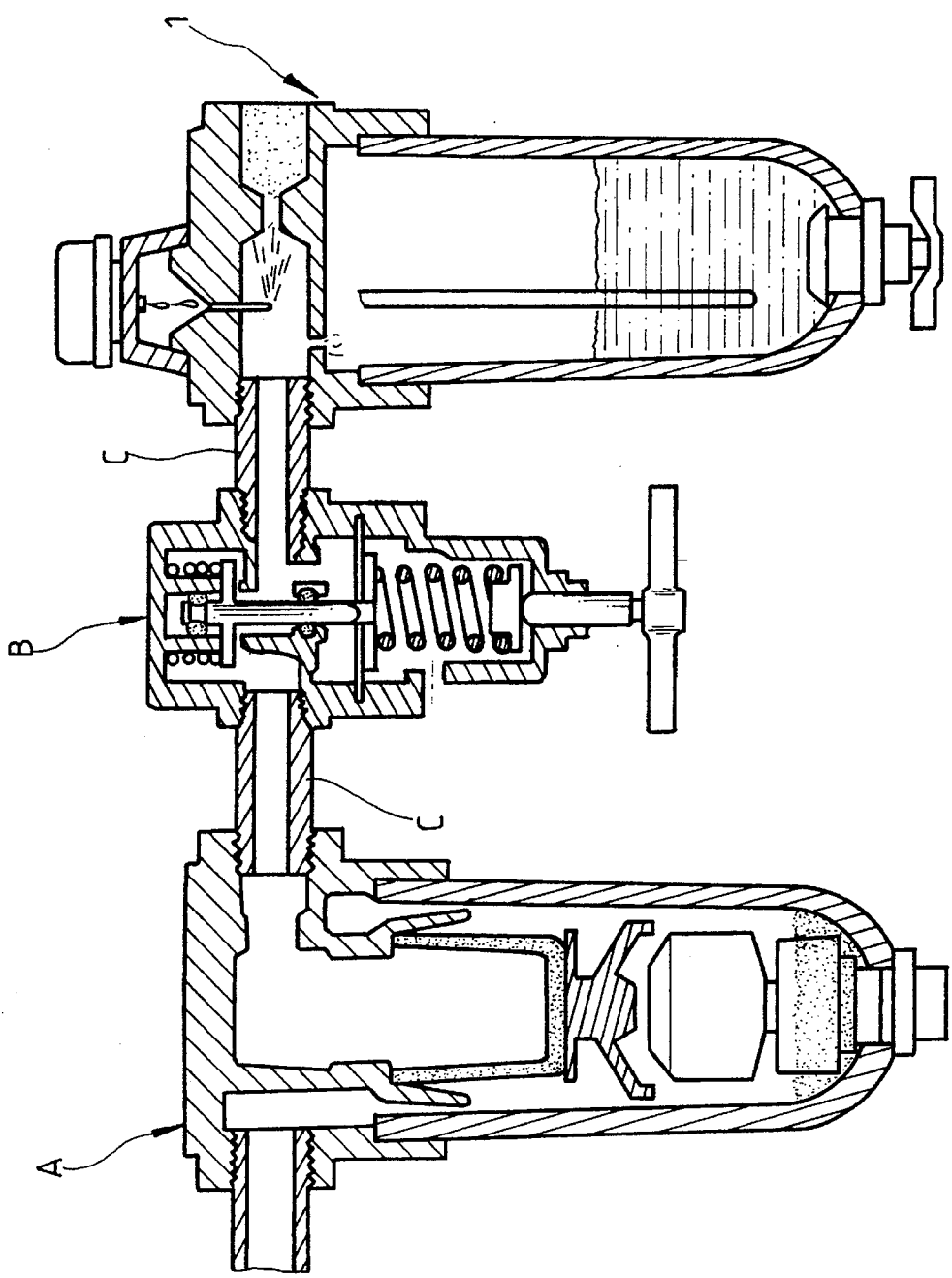
FIG. 7 is a sectional view of another prior art.

As shown in FIGS. 2 and 3, a multiflow chamber is formed within the oil supplying device in accordance with the present invention. The chamber is provided with a blade cap 2 (as shown in FIG. 5). The blade cap 2 is corresponding to the inlet hole 12 of the oil supplying device 1 and the cap 2 can be directly mounted onto the air inlet hole 12. In other words, the inlet air hole of the cap 2 is circular and the outlet hole is a square shape. At the outlet of the oil supplying device, two blades 21 are provided. The two blades have a resilient property and form a gap for the passage of air. A hole 22 is provided at the lateral wall of the cap 2 in combination with the air value mounted within the oil inlet hole. The independently mounted blade cap 2 has a conic shape such that the compressed air within the oil supply device 1 possesses energy which can provide compressed air movement. And, before the compressed air passes the blade 21, it restricts by the blade and enters the cup containing lubrication oil via hole 22, such that the lubrication oil in the cup acquires a higher pressure. When the air passes through the nozzle 13, the lubrication oil can be sucked out smoothly and an excellent atomized effect is thus obtained.

In combination with the elasticity of the two blades 21 of the blade cap 2 and the guiding purpose of the chamber, such that the compressed air is resisted by the blades 21 and the inclined angle of the. blade 21 will be automatically controlled based on the fluid pressure in order to attain the guiding purpose (as shown in FIG. 5-1). When the compressed air passes through the nozzle 13, the air is compressed such that the lubrication oil sucked by the nozzle 13 can acquire better atomized effect to pass through the inner conic face 61 of the seat 6 and the outlet hole 15 into the pneumatic tools to avoid pollution.

As various possible embodiments might be made of the above invention, and as various modifications might be made in the embodiment above set forth, it is to be understood that all matter herein described as shown in the accompanying drawings is to be interpreted as illustrative and not in a limiting sense. Thus it will be appreciated that the drawings are exemplary of a preferred embodiment of the invention.

I claim:

1. An oil atomizing device to lubricate pressurized air in a compressed air system, the device comprising: an oil supply cup; a nozzle; an oil guiding tube connected between said nozzle and said cup to direct oil from said cup to said nozzle; a chamber having an air inlet extending from the chamber to the exterior of the device, the air inlet having a circular shape; a conical flow guide mounted in the chamber having a flow guide air inlet of circular configuration and a flow guide air outlet of square configuration; a plurality of resilient flaps located at the air flow guide outlet; a lateral wall of the flow guide and chamber having aligned holes communicating with the cup, such that the conical shaped flow guide causes a portion of compressed air in the flow guide to flow into the cup containing oil when compressed air passes through the nozzle, such that the lubrication air can be smoothly sucked out.

2. The oil atomizing device of claim 1, wherein the nozzle has an external throttle and an internal throttle.

3. The oil atomizing device of claim 2, wherein the inner throttle has a conically shaped hole.

* * * * *